(12) United States Patent
Feuerman

(10) Patent No.: US 7,685,522 B1
(45) Date of Patent: Mar. 23, 2010

(54) SELF-DESCRIBING FORMS

(75) Inventor: Kenneth E. Feuerman, Fremont, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1117 days.

(21) Appl. No.: 10/700,829

(22) Filed: Nov. 3, 2003

(51) Int. Cl.
*G06F 17/00* (2006.01)

(52) U.S. Cl. .................... 715/728; 715/202; 715/730; 707/10

(58) Field of Classification Search ............... 707/101, 707/1, 104.1; 705/71; 283/70; 345/727; 715/500.1; 704/270.1
See application file for complete search history.

(56) References Cited

U.S. PATENT DOCUMENTS

| | | | |
|---|---|---|---|
| 5,060,980 A * | 10/1991 | Johnson et al. ............... 283/70 |
| 5,486,686 A | 1/1996 | Zdybel, Jr. et al. |
| 5,530,950 A | 6/1996 | Medan et al. |
| 5,825,006 A | 10/1998 | Longacre et al. |
| 6,018,710 A | 1/2000 | Wynblatt et al. |
| 6,540,142 B1 | 4/2003 | Alleshouse |
| 6,624,826 B1 * | 9/2003 | Balabanovic ................ 715/727 |
| 6,711,714 B1 * | 3/2004 | Wynblatt et al. ......... 715/500.1 |
| 6,764,009 B2 | 7/2004 | Melick et al. |
| 6,766,298 B1 * | 7/2004 | Dodrill et al. ............ 704/270.1 |
| 6,823,075 B2 | 11/2004 | Perry |
| 6,882,737 B2 | 4/2005 | Lofgren et al. |
| 6,973,477 B1 | 12/2005 | Martino |
| 2002/0067854 A1 * | 6/2002 | Reintjes et al. ............. 382/199 |
| 2004/0153968 A1 | 8/2004 | Ching et al. |
| 2004/0254791 A1 * | 12/2004 | Coifman et al. ............. 704/246 |
| 2005/0061890 A1 | 3/2005 | Hinckley |
| 2007/0011206 A1 * | 1/2007 | Gupta et al. ............. 707/104.1 |

OTHER PUBLICATIONS

Barnes, et al. "Two Dimensional Bar Coding", Purdue University, Tech 621, Spring, 1999 pp. 1-46.
Harvey Spencer Associates, Inc. "Forms Capture and Forms Processing", http://www.hsassocs.com/products/forms_capture.html, 2001, last updated Oct. 16, 2002, 3 pages.
Harvey Spencer Associates, Inc. "Standard to Encode Data on Forms", http://www.hsassocs.com/prelim%20encode%20std.pdf, downloaded from the Internet on Jul. 23, 2003 (undated), 9 pages.
Captiva Software Corporation "Products>Form Ware>Form Ware Enterprise, Features", http://www.captivasoftware.com/products/formware6.asp, 2002, 2 pages.

(Continued)

*Primary Examiner*—Doug Hutton
*Assistant Examiner*—Quoc A Tran
(74) *Attorney, Agent, or Firm*—Fish & Richardson P.C.

(57) ABSTRACT

Methods and apparatus, including computer program products, implementing and using techniques for generating a form and extracting user data from a form, the form including one or more data fields. Zoning information and structural information about the data fields are defined and encoded according to a symbology defined by rules for encoding information in a medium in which the form will be presented. The encoded zoning and structural information is incorporated in a representation of the form to be presented in the medium. Data entered on the form by a user can be extracted based on the encoded zoning and structural information.

14 Claims, 3 Drawing Sheets

OTHER PUBLICATIONS

Captiva Software Corporation "Products>Form Ware>Form Ware Enterprise, Universal Information Capture Software", http://www.captivasoftware.com/products/formware1.asp, 2002, 2 pages.

Captiva Software Corporation "Products>Form Ware>Form Ware Enterprise, Powerful Features", http://www.captivasoftware.com/products/formware2.asp, 2002, 2 pages.

Captiva Software Corporation "Products>Form Ware>Form Ware Enterprise, Easy Setup and Administration", http://www.captivasoftware.com/products/formware3.asp, 2002, 2 pages.

Captiva Software Corporation "Products>Form Ware>Form Ware Enterprise, Distributed Process", http://www.captivasoftware.com/products/formware4.asp, 2002, 2 pages.

Captiva Software Corporation "Products>Form Ware>Form Ware Enterprise, Solutions for your Industry", http://www.captivasoftware.com/products/formware5.asp, 2002, 2 pages.

Systems Imaging, Inc. "I. Data Capture, OCR, Forms Design & Processing", http://www.sysimaging.com/datacapture.htm, 2002, 4 pages.

"ScanSoft Capture Development System 12 Adds Asian OCR, Combines Superior Accuracy and Speed with PDF and XML", Business Wire, No. 5461, Apr. 7, 2003, 5 pages.

ScanSoft, Inc. "Home>Products>Capture Development System, Key Features", http://www.scansoft.com/capturesdk/features.asp, 2003, 2 pages.

ScanSoft, Inc. "ScanSoft Capture Development System 12 Adds Asian OCR, Combines Superior Accuracy and Speed with PDF and XML", http://www.scansoft.com/news/pressreleases/2003/20030407_capture.asp, Apr. 7, 2003, 5 pages.

ScanSoft, Inc. "Home>Products>Capture Development System, Product Overview", http://www.scansoft.com/capturesdk/overview.asp, 2003, 4 pages.

ScanSoft, Inc. "Home>Products>Capture Development System, Integrated PDF Toolkit", http://www.scansoft.com/capturesdk/pdftoolkit, 2003, 2 pages.

Image Access, "The Performance Scan Station for Stand Alone and Network Environments", http://www.imageaccess.de/ger/bscan-standard.html, 1999, last updated Jun. 15, 2000, 7 pages.

"Cardiff's LiquidOffice™ eForm Management System Selected by the City of Boston to Replace its Manual Form Processes", PR Newswire, No. LAM04213052002, May 13, 2002, 3 pages.

Global Data Solutions, "Can Your Company Use Formatta eForms?", downloaded from the Internet Aug. 2003 (undated), 2 pages.

DCS, "What is Data Capture?", http://www.dsc-va.com/page30.html, downloaded from the Internet Sep. 2003 (undated), 3 pages.

AnyDoc Software, Inc. "The Solution for Capturing all the Vital Data and Images From Your Documents", http://www.mti-info.com/Products/OCRforAnyDoc/main.asp, downloaded from the Internet Aug. 2003 (undated), 2 pages.

ReadSoft AB, "Forms5 Product Overview", 2002, pp. 1-30.

"Input Software: Initial Three Products Attain InputAccel Certification to Solve Data Capture Requirements", Business Wire, Oct. 22, 1998, 3 pages.

Cardiff Software, Inc. "Information Capture System", 1991-2002, 10 pages.

Seward Consulting, Inc. "Products, Forms Processing", http://www.sewardconsulting.com/Imaging/products_datacapture.htm, downloaded from the Internet Sep. 2003 (undated), 10 pages.

IBM Corporation, "IBM Intelligent Forms Processing Services Offering", downloaded from the Internet Aug. 2003 (undated), 8 pages.

CNET Networks, Inc. "Kofax Ascent Capture v5.51", http://www.zdnet.com.au/reviews/software/business/story/0,2000023555,20270277-3,00.htm, 2003, 5 pages.

IBM Corporation, "how IFP works>Data Capture, Scan & Import", http:///www2.clearlake.ibm.com/GOV/ifp/data_capture.html, downloaded from the Internet Oct. 2003 (undated), 1 page.

IBM Corporation, "how IFP works>Data Verification", http://www2.clearlake.ibm.com/GOV/ifp/data_validation.html, downloaded from the Internet Oct. 2003 (undated), 2 pages.

IBM Corporation, "IPF Functions", http://www2.clearlake.ibm.com/GOV/ifp/how_ifp_works.html, downloaded from the Internet Oct. 2003 (undated), 1 page.

IBM Corporation, "Systems Services", http://www2.clearlake.ibm.com/GOV/ifp/system_services.html, downloaded from the Internet Oct. 2003 (undated), 1 page.

IBM Corporation, "how IFP works>Data Output", http://www2.clearlake.ibm.com/GOV/ifp/data_output.html, downloaded from the Internet Oct. 2003 (undated), 1 page.

Arch Data Systems, Inc. "Generating Real Business Value with Teleform" http://www.cdstorage.com/imagingsolutions/Cardiff_Software.htm, © 1998-2000, last updated Nov. 7, 2002, 2 pages.

Information Access Systems, Inc. "How Does Automated Data Entry Work?" http://www.iasinc.net/formsprocessing/e-capture-works.htm, downloaded from the Internet Sep. 5, 2003 (undated), 4 pages.

TMS, Inc. "TMSSequoia and the 2000 Census", http://www.tmsinc.com/solutions/ff_at_work.html, © 1999-2002, 4 pages.

CNET Networks, Inc. "Canon imageReal Capture v3", http://www.zdnet.com.au/reviews/software/buisness/story/0,2000023555,20270277-2,00.htm, © 2003, 3 pages.

Free Form Recognition, Inc. "Prosar-Aida", http://www.freeformrecognition.com/vi.htm, © 2002, last updated Aug. 13, 2002, 2 pages.

Paradatec GmbH, "Prosar-Aida: AI-Based Document Analysis", Jan. 2002, 3 pages.

Kanai, et al. "Automated Evaluation of OCR Zoning", IEEE Transactions on Pattern Analysis and Machine Intelligence, vol. 17, No. 1, Jan. 1995, pp. 86-90.

D.E. Levine, "Not Your Sun's Microsystems", WinPlanet.com, http://www.winplanet.com/winplanet/reports/3281/1/, Apr. 27, 2001, 2 pages.

Tal Technologies, "High Resolutino Graphics" Downloaded from the Internet on Oct. 11, 2006 at http://www.taltech.com/products/dll_barcodes.html, 2 pages.

"Ultraforms 2-D Barcodes for PDF Forms", Dataintro Software, retrieved from the internet at http://www.dataintro.com on Apr. 28, 2005, 4 pages.

"Barcode Recognition Software", Barcode recognition from raster image, Data Matrix, QR Code, Linear Barcodes, retrieved from the internet at http://www.axtel.com , on May 2, 2005, 20 pages.

"Create New Advantage. Symbol. The Enterprise Mobility Company", retrieved from the internet at file://C:DOCUMe~1\rpi/LOCALS~1\Temp\7RRE890T.htm on May 2, 2005, 236 pages.

\* cited by examiner

Administrative Services

ENROLLMENT FORM

100 ⟶

Allen B. Smith ⟵ 125
Employee Name ⟵ 105
123 4567 89 ⟵ 130
Social Security Number ⟵ 110
Employee Home Street Address

⟵ 115
⟵ 120

City     State   Zip

Date of Birth     Daytime Phone Number

Employee E-Mail Address

Employer Name

Plan Year

Number of Pay Periods in Plan Year

Division (as applicable)

---

Health Care Spending Account - allows you to use pre-tax dollars to pay for expenses, which are not 100% covered or are ineligible for payment through any group health care plan(s) under which you or your spouse are covered. Please check your selection:

☐ Yes, I elect to participate:
☐ No, I elect not to participate

Plan Year Contribution   ÷   # of Pay Periods in Plan Year   =   Pay Period Pre-Tax Contribution

---

Dependent Care Spending Account - allows you to use pre-tax dollars to pay for eligible dependent care (i.e. daycare) expenses, which enable you, or your spouse (if applicable) to work or attend school on a full-time basis. Please check your selection:

☐ Yes, I elect to participate:
☐ No, I elect not to participate

Plan Year Contribution   ÷   # of Pay Periods in Plan Year   =   Pay Period Pre-Tax Contribution

---

Premium Payment Plan - This may be an optional plan offered by your employer. Please check your Plan Highlights or with your Human Resources department to confirm if your company is offering this benefit and if you are required to make an election. The Premium Payment Plan allows you to pay for your portion premiums and that of your dependent(s) (as defined in Section 152) of employer-provided benefits on a pre-tax basis. Please check your selection:

☐ Yes, I elect to participate      ☐ No, I elect not to participate

---

I authorize the above elections and the subsequent adjustments to my base annual salary. I acknowledge there is a grace period in which to submit reimbursement requests for expenses incurred during the plan year, and upon expiration of the grace period, any unused funds will be forfeited. I hereby acknowledge my monthly pre-tax premium contributions are subject to change at my company's discretion. I understand I will be notified in advance of any changes. I understand my elections are binding for the entire plan year and cannot be altered, other than by my employer, or unless I experience a qualifying status change. I understand I may experience future reduction in life, disability, and Social Security benefits by participating in the Flexible Spending Plan. I understand, at the option of my employer, my election in relation to the Premium Payment Plan may automatically continue in subsequent plan years. Furthermore, I consent to     use of my treatment, payment and health care operation information as defined under HIPAA, for the purpose of administering my Flexible Spending Account(s).

X _____     X _____
Participant Signature for Flexible Spending Account(s)     Date

Must Be Completed By Employer:

Date of Hire    Effective Date    Payroll Cycle    Payroll Number    Employer Initials    Date

⟵ 135

FIG. 1

```
<?xml version="1.0" encoding="UTF-8"?>          ⌐325
<xfa:data>
<ProBusinessEnrollment>   310
              305⌐       ⌐320
   <EMP_NAME y="28.575mm" x="9.525mm" w="95.25mm" h="6.35mm" type="alpha"></EMP_NAME>}302
   <SSN y="38.1mm" x="9.525mm" w="95.25mm" h="6.35mm" type="numeric"></SSN>
   <EMP_STR_ADDR y="47.6mm" x="9.5mm" w="95.25mm" h="6.35mm" type="alphanumeric"></EMP_STR_ADDR>
   <EMP_CITY y="57.15mm" x="9.525mm" w="57.15mm" h="6.35mm" type="alpha"></EMP_CITY>
   <EMP_STATE y="57.15mm" x="66.675mm" w="12.7mm" h="6.35mm" type="alpha"></EMP_STATE>
   <EMP_ZIP y="57.15mm" x="79.375mm" w="25.4mm" h="6.35mm" type="numeric"></EMP_ZIP>
   <EMP_DOB y="66.675mm" x="9.525mm" w="57.15mm" h="6.35mm" type="alphanumeric"></EMP_DOB>
   <EMP_DAY_PH y="66.675mm" x="66.675mm" w="38.1mm" h="6.35mm" type="numeric"></EMP_DAY_PH>
   <EMP_EMAIL y="28.575mm" x="111.125mm" w="95.25mm" h="6.35mm" type="alphanumeric"></EMP_EMAIL>
</ProBusinessEnrollment>
</xfa:data>
```

SELF-DESCRIBING FORMS

BACKGROUND OF INVENTION

This invention relates to techniques for generating and processing self-describing forms. Form processing refers to the process of extracting data from a form, such as the extraction of handwritten or machine printed data from a paper-based form or the extraction of audio data from an audio-based form. For example, sales orders, credit card applications, enrollment questionnaires and surveys can all require the insertion of data onto a printed form by a user, either by handwriting or using a machine, such as a typewriter. Historically, extracting user data from a form required a human operator to read the form and manually key the data into a storage system such as a database—a labor-intensive and therefore expensive and time consuming task.

With the advent of automated form processing technology, including the use of optical character recognition (OCR) and intelligent character recognition (ICR), the task has become more efficient, reducing the need for human operators. A paper-based form that includes form data, that is, the information printed onto the form itself (e.g., the word "Address"), and user data, that is, the information added to complete the form by a user (e.g., the user's address), can be used to create an image file of the completed form. For example, the paper-based form can be image scanned to create a PDF or TIFF file. A program receives the image file as input, locates the user data, and translates the images forming the user data into character codes, for example, ASCII, and may output a text file. The program can be an OCR program, which is typically used to recognize machine-printed characters, an ICR program, which is typically used to recognize handwritten characters, or a program that can perform both OCR and ICR. Hereinafter, the term "OCR/ICR program" shall be used to refer to a program that can perform either OCR, ICR or both. The OCR and ICR processes typically involve complex image processing algorithms and may require manual proof reading to correct inaccuracies.

In order to distinguish between forms data and user data, information can be provided to the OCR/ICR program that identifies locations on the form where user data is expected to be found, typically referred to as zoning information. Additional information can be provided, that identifies certain aspects of the user data expected to be found at a particular location. For example, with respect to a form field requesting the user's social security number, information can be provided to the OCR/ICR program specifying that a numerical value is expected. When performing character recognition, the OCR/ICR program will therefore not mistake, for example, the number "1" with the letter "l".

One conventional method of making zoning and other such information accessible to an OCR/ICR program is to maintain a catalog of information related to a set of forms, which is accessible by the OCR/ICR program, for example, via a networked database. In order to use the catalog, the OCR/ICR program first identifies the form, so that the corresponding zoning information can be retrieved. A form identifier can be encoded onto the form, for example, using a two-dimensional (2D) graphical symbol, such as a 2D barcode. The OCR/ICR program reads the barcode, learns the identity of the form, and looks up the corresponding zoning information in a catalog accessible by the OCR/ICR program. Alternatively, a barcode can encode a URL address, which the OCR/ICR program can use to retrieve the corresponding zoning information from a remote location, for example from the location specified by the URL and using an Internet connection. The zoning information can then be used to facilitate the processing of the form, as described above.

SUMMARY

The present invention provides methods and apparatus, including computer program products, for creating and reading forms including one or more data fields. In general, in one aspect, the invention features generating a form having one or more data fields, including defining zoning information identifying a location of the one or more data fields of the form and defining structural information about the one or more data fields. The zoning and structural information is encoded according to a symbology defined by rules for encoding information in a medium in which the form will be presented. The encoded zoning and structural information is incorporated in a representation of the form to be presented in the medium.

In general, in another aspect, the invention features creating a form having one or more data fields, including generating a form definition defining the form. The form definition includes zoning information describing a location of the one or more data fields. The zoning information is encoded according to a symbology defined by rules for encoding information in a medium in which the form will be presented. The encoded zoning information is incorporated in a representation of the form to be presented in the medium. The data entered on the form by a user can be extracted from the representation based on the encoded zoning information, without access to a source of zoning information external to the form.

In general, in another aspect, the invention features creating a form having one or more data fields, including generating a form definition defining the form. The form definition includes an XML representation of zoning information describing a location of the one or more data fields and structural information about the one or more data fields. The XML representation of the zoning and structural information is encoded according to a two-dimensional symbology defined by rules for encoding information in a visual medium in which the form will be presented. The encoded zoning and structural information is incorporated in a visual representation of the form. The data entered on the form by a user can be extracted from the representation based on the encoded zoning and structural information, without access to a source of zoning and structural information external to the form.

Implementations can include one or more of the following. The medium can be a visual medium (e.g., paper) and the zoning and structural information can be encoded in a graphical symbol. A graphical symbol can be a two-dimensional symbol, for example, a two-dimensional barcode or a DataGlyph®. The medium can be an audio medium and the zoning and structural information can be encoded in an audio signal. The zoning and structural information can be represented in XML and the XML representation can be encoded according to the symbology.

Where the medium is a visual medium, the zoning information can include two-dimensional coordinates specifying a location of each of the data fields and corresponding measurements in two dimensions of each of the data fields. Where the medium is an audio medium, the zoning information can include a temporal location of each of the data fields in an audio recording and temporal dimensions of each of the data fields. The structural information can include a name for each of the data fields, and/or can include a description of user data expected to filled in each of the one or more data fields (e.g., numeric or alpha). The data entered on the form by a user can be extracted from the representation based on the encoded zoning and structural information, without access to a source of zoning or structural information external to the form.

In general, in another aspect, the invention features receiving an electronic representation of a form including user data associated with one or more data fields. The form incorporates zoning information describing a location of the one or more data fields, and structural information about the one or more data fields. The zoning and structural information are encoded according to a symbology defined by rules for encoding information in a medium in which the form is presented to a user. The zoning and structural information is decoded, and the user data is extracted from the electronic representation of the form using the decoded zoning and structural information, without access to a source of zoning or structural information external to the electronic representation of the form.

Implementations of the invention can include one or more of the following. The medium can be a visual medium (e.g., paper) and the electronic representation of the form can be a PDF file or a TIFF file. The medium can be an audio medium and the electronic representation of the form can be a digital audio file. Where the medium is a visual medium, the encoded zoning and structural information can be a graphical symbol, such as a two-dimensional symbol (e.g., a two-dimensional barcode or DataGlyph). Where the medium is an audio medium, the encoded zoning and structural information can be an audio signal. The zoning and structural information can be represented in XML.

The invention can be implemented to realize one or more of the following advantages. Self-describing forms that incorporate encoded zoning and structural information in a representation of the form can be processed by an OCR/ICR program independent of zoning and structural information from a source external to the form. That is, the zoning and structural information describing the form is accessible to the OCR/ICR program from the form itself, and without requiring access to external zoning and structural information accessible, for example, from a forms catalog or website. There is no need to issue a form identification number (ID), register the ID in a catalog, maintain the catalog up-to-date and imprint the ID on the form. Delays associated with entering the information into a separate catalog or database, before the form can be processed by an OCR/ICR program, are eliminated. Additionally, because the OCR/ICR program does not need to access an external catalog or database, a machine executing the OCR/ICR program does not have to be connected, via the Internet or otherwise, to a remote source including zoning and structural information.

The zoning and structural information associated with a form can be changed and the updated information can be encoded on any subsequently generated forms. Because the encoded zoning and structural information is incorporated in the form, and therefore always consistent with the particular version of the form, there is no chance that an inconsistent version of the zoning and structural information will be used to process a form. Additionally, because the life of a specific version of a form may not be known, the requirement of maintaining a potentially large collection of form identifiers and corresponding zoning and structural information for an indeterminate amount of time is avoided.

The details of one or more embodiments of the invention are set forth in the accompanying drawings and the description below. Other features and advantages of the invention will be apparent from the description, the drawings, and the claims.

DESCRIPTION OF DRAWINGS

FIG. 1 shows a paper-based form.

FIG. 3 is an XML representation of zoning and structural information.

Like reference symbols in the various drawings indicate like elements.

DETAILED DESCRIPTION

Figure 2:
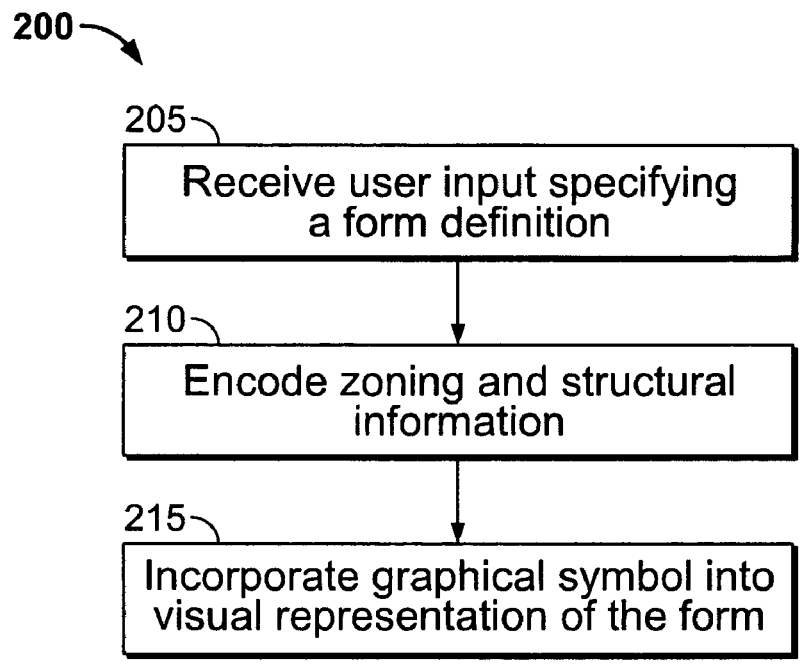
FIG. 2 is flowchart showing a process for creating a form.

A form for collecting user data is created, including one or more data fields where a user filling in the form is expected to enter the user data. An author of the form defines zoning information identifying locations within the form of the one or more data fields, and therefore locations where user data can be expected to be found by an OCR/ICR program extracting the user data from the form. Optionally, a form author can further specify structural information that can describe the form, the data fields and/or relationships between the data fields (other than the location of the data fields, which is specifically referred to herein as zoning information). The zoning information, and optionally the structural information, is encoded according to a symbology that is defined by rules for encoding zoning and structural information in a medium in which the form will be presented to a user. The encoded zoning and structural information (i.e., an encoded representation of that information) is incorporated in a representation of the form to be presented in the medium. The user data entered by a user can be extracted from the representation based on the encoded zoning and structural information. In particular implementations, the use of encoded zoning and structural information makes it possible to extract the user data without access to a source of zoning or structural information external to the form.

In one implementation, the form can be presented to a user on a visual medium, for example, paper. FIG. 1 shows a paper-based form 100 including data fields 115, 120, and associated form data that textually identifies or describes information to be entered in the fields, such as the field names "Employee Name" 105 and "Social Security Number" 110. Fields 115, 120 provide locations for entering user data, such as the name 125 and the social security number 130 of a user. The zoning and structural information is encoded in a graphical symbol 135 incorporated on the face of the form 100.

In the case of a paper-based form, exemplary zoning information can include the width and height of a rectangular field where user data is expected, and coordinates in x and y planes indicating the position of, for example, the upper-left corner of the field. An OCR/ICR program thereby knows where on a form to perform character recognition and does not perform unnecessary character recognition on the form data itself.

Structural information is information describing the form, the data fields and/or the relationships between the data fields. For example, structural information can include a description of the type of user data expected to be entered in a data field to facilitate character recognition, such as "alpha" or "numeric". Structural information can include a name of a field, so that the user data extracted from the field can be associated with the field name in an OCR/ICR program's output. Structural information can include the number of data fields in a form, or relationships between the fields, such as the order in which the fields appear in a visual representation of the form, or a grouping of fields to be treated as a logical unit (e.g., a grouping including fields named "street address", "city", "state" and "zip code").

Where the encoded representation of the zoning and structural information is to be incorporated in a visual representation of the form, the encoded representation can be a graphical symbol. The graphical symbol encoding zoning and structural information can be any computer-generated glyph, character, token, emblem or other graphical mark that can be used to encode information in a format that can be captured and decoded by an image capture device, such as a scanner or CCD (charge-coupled device, e.g. a digital camera), and/or an OCR/ICR program or device. The OCR/ICR program can be a standalone application, or a component (e.g., a plug-in) of a forms processing program that will be used to process the form.

In one implementation, the graphical symbol is a two-dimensional symbol, such as a stacked or matrix type 2D barcode. For example, the graphical symbol 135 shown in FIG. 1 is a stacked 2D PDF417 barcode. Traditional one-dimensional barcodes are vertically redundant, repeating the same information vertically. 2D symbols encode data vertically as well as horizontally, increasing the density of information that can be included in a barcode of a given size. A stacked barcode consists of several thin horizontal slices of regular one-dimensional barcodes stacked on top of each other, forming an array that is scanned vertically as well as horizontally. Stacked barcodes can be read with a document scanner or a CCD (e.g., digital camera). Matrix barcodes encode information using fixed-width light and dark cells and are read with a CCD.

Other 2D symbologies that can be used to provide graphical symbols 135 include "DataGlyphs®" developed the Palo Alto Research Center (PARC), a subsidiary of Xerox Corporation, in Palo Alto, Calif. A DataGlyph is a pattern of small "\"s and "/"s encoding binary data. DataGlyphs are designed to blend into an image or graphic in which they are incorporated, and can form background shapes, for example, logos, or tints behind text or graphics. DataGlyphs can be aesthetically pleasing and less obtrusive on the face of a form than a dedicated symbol, such as a barcode. A DataGlyph can be read using a document scanner or CCD (e.g., digital camera).

A OCR/ICR program decodes the graphical symbol to retrieve the zoning and structural information, and uses the zoning and structural information to extract the user data 125, 130. No access to a data store, or any other source of information housing zoning or structural information that is external to the form, is required to retrieve the zoning and structural information. The form can be processed independent of any such external data store, and there is no need for a machine executing the OCR/ICR program to have network or Internet access to an external data store, nor is there a need to maintain such an external data store of zoning and structural information corresponding to a set of forms, potentially including different zoning and structural information for different versions of the same form.

FIG. 2 is a flowchart showing a method 200 for generating a form having zoning and structural information encoded in a graphical symbol incorporated on the face of the form, as shown in FIG. 1. The method can be implemented in a forms authoring program such as Adobe® Forms Designer, available from Adobe Systems Incorporated of San Jose, Calif. The forms authoring program is used to create a form. The author specifies a form definition, that is, defines a plurality of fields for the form and specifies form data associated with each field (e.g., Employee Name 105) and a location of the field (Step 205). Additionally, the author can define structural information about the form, for example, the number of fields in the form, and structural information specific to a field. For example, the author can specify that the Employee Name field 115 has a type "alpha", and the Social Security Number field 120 has a type "numeric", where the type of user data expected (i.e., alpha or numeric) is structural information.

The forms authoring program generates a description of the zoning information and structural information in a suitable format. In one implementation, the zoning and structural information can be represented in XML. FIG. 3 shows an example of an XML representation of zoning and structural information 300 corresponding to the form shown in FIG. 1. The form's author defined a name, location and data type for each field. For example, the Employee Name field 115 is represented in XML by the data string 302, including a name 305, specified by the author as "EMP_NAME", a location specified as x and y coordinates with explicit measurement units (e.g., millimeters (mm)) 310, a field size specified as width (w) and height (h) 315 (also with explicit units), and a type 320, specified as "alpha".

The zoning information, that is, the x and y coordinates and the width and height of the field, can be used by an OCR/ICR program to locate user data corresponding to the Employee Name field. The field name, EMP_NAME 305 can be included by the OCR/ICR program in an XML string output by the program in association with the user data extracted from the associated location. The type (e.g., alpha) can be used by the OCR/ICR program to facilitate character recognition, for example, to distinguish between the number "1" and the letter "1". An XFA (XML Forms Architecture) specification can be defined to specify a format for zoning and structural information, for example, using parts of existing specifications, such as XFA specifications for templates and datasets. The XML representation of zoning and structural information can then conform to such an XFA specification.

The forms authoring program constructs an XML string incorporating the zoning and structural information, as described above, and can then optionally compress the string using conventional text compression techniques, such as flate compression. The resulting binary data can then be encoded according to rules and algorithms of a particular symbology selected, for example, a PDF417 barcode, such as barcode 135 shown in FIG. 1 (Step 210).

The result is a graphical symbol in the form of a bitmap image, and the forms authoring program can prompt the author for placement of the bitmap image onto the face of the form. The graphical symbol 135 is thereby incorporated into a visual representation of the form 100 (Step 215). The form can be output as an image file, for example, a PDF file, which can be emailed to a user, or accessed by a user over a network, such as the Internet. The user can then print a paper copy of the form (complete with the graphical symbol 135) and fill in the user data either by writing the data by hand, or using a machine, such as a typewriter. Alternatively, a paper copy of the form (including the graphical symbol 135) can be provided to a user in the first instance, for example, a new patient form provided to a user upon an initial visit to a doctor's office.

The selection of a particular format for the graphical symbol 135 can depend on the particular application, such as the expected workflow in which the form will be used. Some graphical symbols are more robust with respect to typical workflow damage, page skewing (e.g., when faxing), spillage and obliteration than others. Some graphical symbols may be more compact, taking up less space on the form, while others, such as the DataGlyph, may be less visually obtrusive or more aesthetically pleasing. A PDF417 barcode exhibits the advantages of denser data representation under poor imaging circumstances, e.g. faxing, is an open standard and is widely used.

Figure 4:
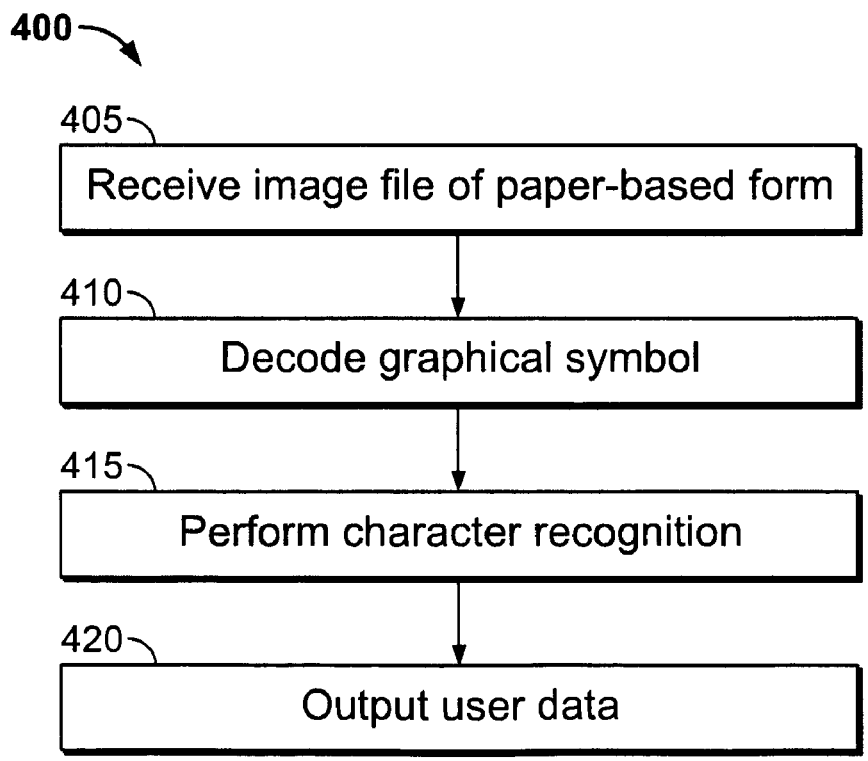
FIG. 4 is a flowchart showing a process for processing a form.

FIG. 4 is a flowchart showing a method 400 for extracting user data from a form that incorporates a graphical symbol encoding zoning and structural information into the form. The method can be implemented in an OCR/ICR program, such as Adobe® Capture, available from Adobe Systems Incorporated of San Jose, Calif. A paper copy of a completed form (i.e., a form in which a user has filled in one or more fields with user data) that includes a graphical symbol encoding zoning and structural information is received by a form recipient. An electronic representation of the paper form is created, for example, an image file created by image scanning the paper copy using a document scanner to create a PDF file. Alternatively, an image file of a completed form can be directly received by the recipient, for example, if the user scans and e-mails the completed form to the recipient.

An OCR/ICR program receives as input the image file of the completed form (Step 405). The OCR/ICR program decodes the graphical symbol, for example, the PDF417 2D barcode 135 on form 100, to retrieve zoning and structural information describing the form 100 (Step 410). The OCR/ICR program performs character recognition, using the zoning information to locate the user data, and the structural information to facilitate translation of the user data (Step 415). For example, as described above with reference to the Employee Name field 115, the OCR/ICR program uses the x and y coordinates 310 and the width and height 315 of the field to locate the user data corresponding to the Employee Name field on the form. The OCR/ICR program uses the type, alpha 320, to facilitate character recognition.

The output from an OCR/ICR program can depend on the intended recipient, for example, a database application or other such application, and might be in the form of a text file or a stream of XML. Referring to the XML representation of zoning and structural information 300 shown in FIG. 3, an OCR/ICR program can output an XML string (Step 420) that looks somewhat similar to the XML representation 300, although some information in the initial XML string, such as the location information (i.e., x and y coordinates 310, width and height 315), may be unnecessary to subsequent processing and therefore omitted from the output stream, and additional information, such as the extracted user content (e.g., "Allen B. Smith" corresponding to the Employee Name field 115) that is required for subsequent processing can be added. The XML string may be meaningless to the OCR/ICR program, however, the names associated with the fields, such as EMP_NAME 305, can have meaning to the recipient program, and provide a way to identify the associated user data.

In addition to zoning and structural information, other data can be encoded in the graphical symbol, for example, instructions indicating where and how to transmit the user data extracted from a form. After decoding the instructions and extracting the user data, the OCR/ICR program can export the extracted user data accordingly, for example, to a database or web server.

In the example described above, the graphical symbol encodes both zoning and structural information. However, in another implementation, the graphical symbol can encode only information identifying the location of fields where user data is expected to be found. Structural information can facilitate character recognition, but is not required for an OCR/ICR program to extract user data from data fields in a form.

The implementation described above incorporated encoded zoning and structural information in a paper-based form. Other implementations are possible, including incorporating encoded zoning and structural information in an audio-based form. For example, an audio-based form can consist of audio signals recording a voice speaking a field name followed by a pause, during which a form user is expected to enter the appropriate user data by speaking (e.g., stating their name). The pattern of speaking a field name followed by a pause is continued until each field name has been presented to the user, and the user has been given an opportunity to enter corresponding user data. Audio signals including the voice speaking the form data and the user's voice speaking the user data together comprise a completed form.

An audio-based forms authoring program can incorporate encoded zoning and structural information into the form, for example, in audio signals detectable and decodable by an audio recognition program used to extract the user data. The zoning information can include a temporal location and temporal dimensions for each data field in the form, e.g., the time in seconds from the start of an audio recording where a data field begins and the duration of a pause provided for the user to enter user data. The structural information can be similar to the structural information provided for a paper-based form, that is, field names, types of user data expected, and the like. An audio recognition program detects and decodes the zoning and structural information, and uses the information to locate and extract the user data, in a similar manner as described above in the context of paper-based forms.

The invention and all of the functional operations described in this specification can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output.

The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language.

Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; a magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

To provide for interaction with a user, the invention can be implemented on a computer system having a display device such as a monitor or LCD screen for displaying information to the user and a keyboard and a pointing device such as a mouse or a trackball by which the user can provide input to the computer system. The computer system can be programmed to provide a graphical user interface through which computer programs interact with users.

The invention has been described in terms of particular embodiments. Other embodiments are within the scope of the following claims. For example, the steps of the invention can be performed in a different order and still achieve desirable results.

What is claimed is:

1. A computer-implemented method for generating an audio-based form represented electronically as a digital audio file, the audio-based form including one or more data fields, the method comprising:

defining zoning information identifying a temporal location and temporal dimensions of the one or more data fields of the audio-based form;

defining structural information including a name for each of the one or more data fields and a description of a type of user data expected to be provided for each of the one or more data fields, where the audio-based form comprises audio signals recording a voice speaking a name of a data field followed by a pause during which a user can speak the user data expected to be provided for the data field;

encoding the zoning and structural information in one or more audio signals; and incorporating the one or more audio signals including the encoded zoning and structural information into the audio-based form.

2. The method of claim 1, wherein data entered on the form by a user can be extracted from the audio-based form based on the encoded zoning and structural information without access to a source of zoning or structural information external to the form.

3. The method of claim 1, further comprising:

encoding instructions indicating where and how to transmit user data extracted from the audio-based form into one or more audio signals; and incorporating the one or more audio signals including the encoded instructions into the audio-based form.

4. A computer-implemented method for creating an audio-based form represented electronically as a digital audio file, the audio-based form including one or more data fields, the method comprising:

generating a form definition defining the audio-based form, the form definition zoning information identifying a temporal location and temporal dimensions of the one or more data fields and structural information including a name for each of the one or more data fields and a description of a type of user data expected to be provided for each of the one or more data fields, where the audio-based form comprises audio signals recording a voice speaking a name of a data field followed by a pause during which a user can speak the user data expected to be provided for the data field;

encoding the zoning and structural information into one or more audio signals; and incorporating the one or more audio signals including the encoded zoning and structural information into the audio-based form;

wherein audio data entered into the audio-based form by a user can be extracted from the audio-based form based on the encoded zoning and structural information without access to a source of zoning or structural information external to the audio-based form.

5. The method of claim 4, further comprising:

encoding instructions indicating where and how to transmit user data extracted from the audio-based form into one or more audio signals; and incorporating the one or more audio signals including the encoded instructions into the audio-based form.

6. A computer-implemented method for creating an audio-based form represented electronically as a digital audio file, the audio-based form including one or more data fields, the method comprising:

generating a form definition defining the audio-based form, the form definition including zoning information identifying a temporal location and temporal dimensions of the one or more data fields, where the audio-based form comprises audio signals recording m a voice speaking a name of a data field followed by a pause during which a user can speak the user data expected to be provided for the data field;

encoding the zoning information in one or more audio signals; and incorporating the one or more audio signals including the encoded zoning into the audio-based form;

wherein data entered into the audio-based form by a user can be extracted from the audio-based form based on the encoded zoning information without access to a source of zoning information external to the audio-based form.

7. The method of claim 6, further comprising:

encoding instructions indicating where and how to transmit user data extracted from the audio-based form into one or more audio signals; and incorporating the one or more audio signals including the encoded instructions into the audio-based form.

8. A computer program product, tangibly stored on a machine-readable storage device, for generating an audio-based form represented electronically as a digital audio file, the audio-based form including one or more data fields, comprising instructions operable to cause a programmable processor to:

define zoning information identifying a temporal location and temporal dimensions of the one or more data fields of the form;

define structural information including a name for each of the one or more data fields and a description of a type of user data expected to be provided for each of the one or more data fields, where the audio-based form comprises audio signals recording a voice speaking a name of data field followed by a pause during which a user can speak the user data expected to be provided for the data field;

encode the zoning and structural information into one or more audio signals; and incorporate the one or more audio signals including the encoded zoning and structural information into the audio-based form.

9. The computer program product of claim 8, wherein data entered on the audio-based form by a user can be extracted from the audio-based form based on the encoded zoning and structural information without access to a source of zoning or structural information external to the audio-based form.

10. The computer program product of claim 8, further comprising instructions operable to cause a programmable processor to:

encode instructions indicating where and how to transmit user data extracted from the audio-based form into one or more audio signals; and incorporate the one or more audio signals including the encoded instructions into the audio-based form.

11. A computer program product, tangibly stored on a machine-readable storage device, for creating an audio-based form represented electronically as a digital audio file, the audio-based form including one or more data fields, comprising instructions operable to cause a programmable processor to:

generate a form definition defining the audio-based form, the form definition including zoning information identifying a temporal location and temporal dimensions of the one or more data fields and structural information including a name for each of the one or more data fields and a description of a type of user data expected to be provided for each of the one or more data fields, where the audio-based form comprises audio signals recording a voice speaking a name of data field followed by a pause during which a user can speak the user data expected to be provided for the data field;

encode the zoning and structural information into one or more audio signals; and incorporate the one or more audio signals including the encoded zoning and structural information into the audio-based form;

wherein data entered into the form by a user can be extracted from the audio-based form based on the encoded zoning and structural information without access to a source of zoning or structural information external to the audio-based form.

12. The computer program product of claim 1, further comprising instructions operable to cause a programmable processor to:

encode instructions indicating where and how to transmit user data extracted from the audio-based form into one or more audio signals; and incorporate the one or more audio signals including the encoded instructions into the audio-based form.

13. A computer program product, tangibly stored on a machine-readable storage device, for creating an audio-based form represented electronically as a digital audio file, the audio-based form including one or more data fields, comprising instructions operable to cause a programmable processor to:

generate a form definition defining the audio-based form, the form definition including zoning information identifying a temporal location and temporal dimensions of the one or more data fields, where the audio-based form comprises audio signals recording a voice speaking a name of a data field followed by a pause during which a user can speak the user data expected to be provided for the data field;

encode the zoning information into one or more audio signals; and incorporate the one or more audio signals including the encoded zoning information into the audio-based form;

wherein data entered into the audio-based form by a user can be extracted from the audio-based form based on the encoded zoning information without access to a source of zoning information external to the form.

14. The computer program product of claim 13, further comprising instructions operable to cause a programmable processor to:

encode instructions indicating where and how to transmit user data extracted from the audio-based form into one or more audio signals; and incorporate the one or more audio signals including the encoded instructions into the audio-based form.

* * * * *

UNITED STATES PATENT AND TRADEMARK OFFICE
CERTIFICATE OF CORRECTION

| | | |
|---|---|---|
| PATENT NO. | : 7,685,522 B1 | Page 1 of 1 |
| APPLICATION NO. | : 10/700829 | |
| DATED | : March 23, 2010 | |
| INVENTOR(S) | : Kenneth E. Feuerman | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1092 days.

In Claim 4, after "definition", insert -- including --.

In Claim 6, after "recording", delete "m".

In Claim 6, after "zoning", insert -- information --.

In Claim 12, delete "1," and insert -- 11, --, therefor.

Signed and Sealed this

Twenty-sixth Day of October, 2010

David J. Kappos
*Director of the United States Patent and Trademark Office*